US010594983B2

(12) United States Patent
Dannan et al.

(10) Patent No.: US 10,594,983 B2
(45) Date of Patent: Mar. 17, 2020

(54) INTEGRATED CAMERA AWARENESS AND WIRELESS SENSOR SYSTEM

(71) Applicant: Robert Bosch GmbH, Stuttgart (DE)

(72) Inventors: Benjamin Robert Dannan, Marietta, PA (US); Ajit Belsarkar, Lancaster, PA (US); Bogdan Viorel Iepure, Lancaster, PA (US); Theodore Leroy Jones, Akron, PA (US); Philip Hennessy, Cochranville, PA (US)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 14/565,655

(22) Filed: Dec. 10, 2014

(65) Prior Publication Data

US 2016/0173827 A1  Jun. 16, 2016

(51) Int. Cl.
*H04N 7/18* (2006.01)
*G08B 13/196* (2006.01)

(52) U.S. Cl.
CPC ....... *H04N 7/181* (2013.01); *G08B 13/19608* (2013.01); *G08B 13/19645* (2013.01); *G08B 13/1965* (2013.01); *G08B 13/19656* (2013.01)

(58) Field of Classification Search
CPC .......................... H04N 7/181; G08B 13/19645
USPC ........................................................ 348/143
See application file for complete search history.

(56) References Cited

U.S. PATENT DOCUMENTS

| | | | |
|---|---|---|---|
| 8,570,150 B1 | 10/2013 | Bowen et al. | |
| 8,620,023 B1 | 12/2013 | Plotke | |
| 2004/0143602 A1* | 7/2004 | Ruiz | H04N 7/181 |
| 2006/0007308 A1 | 1/2006 | Ide et al. | |
| 2007/0039030 A1 | 2/2007 | Romanowich | |
| 2008/0084473 A1* | 4/2008 | Romanowich | G08B 13/19671 348/135 |

(Continued)

FOREIGN PATENT DOCUMENTS

| | | |
|---|---|---|
| CN | 102667518 A | 9/2012 |
| CN | 104135653 A | 11/2014 |
| GB | 2425669 | 11/2006 |

OTHER PUBLICATIONS

Van Dijk, Gert J.A. and Maris, Marinus G., Wireless sensor network for mobile surveillance systems, Networked Embedded Systems department TNO Physics and Electronics Laboratory, Oude Waalsdorperweg 64, 2509 JG, The Hague, The Netherlands, Proceedings of SPIE vol. 5611, SPIE, Bellingham, WA, 2004.) (Year: 2004).*

(Continued)

*Primary Examiner* — Sath V Perungavoor
*Assistant Examiner* — Kristin Dobbs
(74) *Attorney, Agent, or Firm* — Michael Best & Friedrich LLP

(57) ABSTRACT

A surveillance system is provided including an Internet-enabled (IP) camera and nodes that determine the location of a plurality of sensors, which are wirelessly connected to the IP camera. The nodes determine the position of the plurality of sensors and the IP camera through the use of position determining techniques including multilateration, trilateration, and triangulation. Additionally, line of sight positioning methods and global positioning system devices may be used in setting up a positional awareness system, which enables the IP camera to control systems based on condition information and positional awareness.

18 Claims, 14 Drawing Sheets

(56) References Cited

U.S. PATENT DOCUMENTS

| | | |
|---|---|---|
| 2010/0026809 A1 | 2/2010 | Curry |
| 2010/0201829 A1 | 8/2010 | Skoskiewicz et al. |
| 2011/0134240 A1 | 6/2011 | Anderson |
| 2011/0310247 A1 | 12/2011 | Rensin et al. |
| 2012/0090010 A1 | 4/2012 | Dace et al. |
| 2012/0194336 A1 | 8/2012 | Thiruvengada |
| 2013/0172738 A1 | 7/2013 | Bencteux |
| 2013/0307989 A1 | 11/2013 | Stone et al. |
| 2014/0267775 A1 | 9/2014 | Lablans |

OTHER PUBLICATIONS

Extended European Search Report for Application No. 15196810.4 dated Feb. 24, 2016 (7 pages).
First Office Action from the National Intellectual Property Administration, P.R. China dated Aug. 22, 2019 (16 pages).

\* cited by examiner

INTEGRATED CAMERA AWARENESS AND WIRELESS SENSOR SYSTEM

BACKGROUND

The present invention relates to video surveillance using an internet protocol camera and a sensor network.

SUMMARY

In one embodiment, the invention provides a surveillance system including a video camera and a plurality of sensors. The sensors are wirelessly connected to the video camera. Each of the sensors is configured to transmit and receive condition information. The video camera determines a location of each of the sensors relative to each other by using a local position measurement such that the location of each of the sensors creates position information for the video camera. A controller that includes a processor and a memory is configured to operate the video camera to capture video, receive the condition information from the plurality of sensors, and activate an external system based on the position information and the condition information.

In another embodiment the invention provides a surveillance method including transmitting condition information from a plurality of sensors to a video camera. The video camera determines a location of each of the sensors relative to the video camera using a local position measurement such that the location of each of the sensors creates position information for the video camera. The video camera is configured to activate an external system based on the position information and the condition information.

Other aspects of the invention will become apparent by consideration of the detailed description and accompanying drawings.

DETAILED DESCRIPTION

Figure 1:
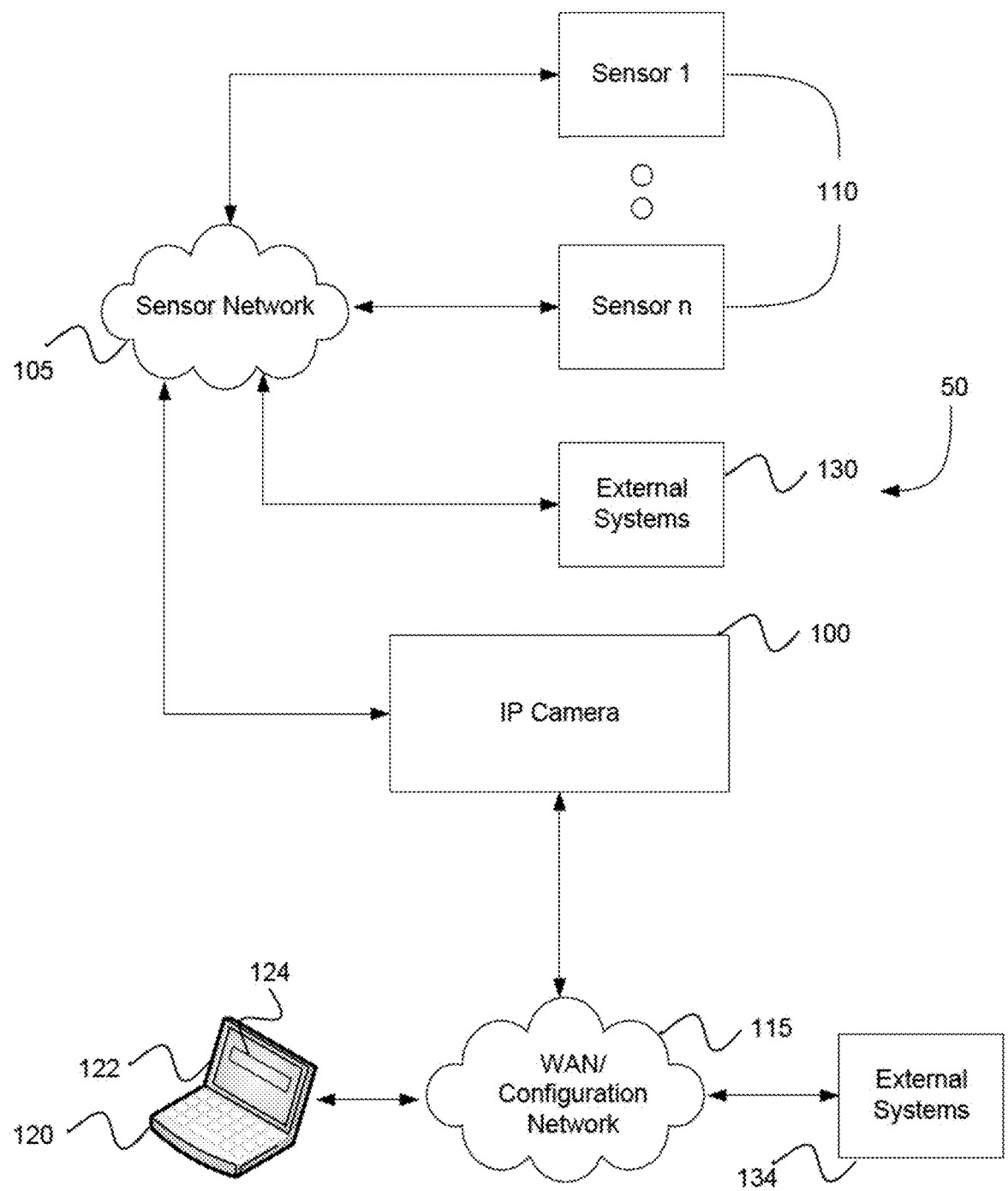
FIG. 1 is a block diagram illustrating a surveillance system including an internet protocol camera.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Traditional camera systems are limited in their awareness of their surroundings by the camera's field of view. The field of view may be limited by the view angle, the view range, and the ability to focus the camera. Several camera designs try to overcome these limitations. For example, a fish-eye lens camera may provide 360° of view angle. However, 360° coverage results in a reduction of fidelity of the camera image. Another design that tries to overcome these limitations uses a pan, zoom, and tilt (PTZ) camera to move and focus on points of interest. However, the PTZ camera does not detect targets or points of interest that are out of the current field of view. As a result, camera-implemented software is employed to compensate for the limited field of view. However, the software is limited by the data supplied by the camera's field of view. Additionally, environmental effects may affect the field of view of the camera and cause the software to improperly react to environmental effects. This hinders the ability of object detection software to accurately assess the situation. The software is further limited by a reduction in the field of view caused from environmental effects.

Further limitations arise from incorporating control and adjustment functionality internally within the camera. An architecture that is centralized in a camera is limited by the physical capabilities of the system. For example, a localized architecture limits the storage of captured video data, limits programming of the camera to on-site setup, and limits configuration changes to local reprogramming. Advantageously, the architecture of the video surveillance system provided herein is decentralized using a wireless sensor network.

FIG. 1 illustrates a video surveillance system 50 that includes an IP camera 100. The system 50 also includes a sensor network 105 that includes a plurality of sensors 110. The IP camera 100 communicates with and is configured to coordinate the system. The IP camera 100 is connected to a second network 115. The second network 115 may be a wide-area network (WAN) such as the internet. Second network 115 is connected to a client device 120 that has a display 122 on which a graphical user interface (GUI) 124 is displayed. The second network 115 is referred to as a "configuration network" in FIG. 1 because, among other things, configuration of certain components of the system 50 may be achieved, as explained in more detail below, based on user inputs made through the GUI 124 of the device 120. The IP camera 100 is configured to process condition information received from the sensors 110 via the sensor network 105. Additionally, the IP camera 100 is configured to send control information to the sensors 110 via the sensor network 105. In one construction, the IP camera 100 includes pan, zoom, and tilt (PZT) functionality. In other embodiments, the IP camera 100 is stationary. The IP camera 100 can be designed to sense different electromagnetic spectrums, including, for example, visible light, infrared, microwave, radar, etc.

Depending on the application of the surveillance system 50, the sensors 110 may take many forms. Optical sensors, including video cameras, still image cameras, infrared cameras, and light sensors may be used. In addition, smoke, fire, temperature, toxicity (e.g., toxic gas), air quality, vibration, sound, radiation, motion, proximity, gun-shot detection, voice recognition, and other types of sensors may be used. In other constructions, the sensors 110 are designed to monitor the health of people or animals. Health monitoring may include individualized monitoring sensors 110 of various physiological functions. Each one of the sensors 110 transmits condition information, which includes information representative of the phenomena it senses and information representative of the health of the sensor. In some cases, each of the sensors 110 provides a continuous stream of condition information, such as video. In other cases, the sensors provide an "alarm" message that may, for example, be representative of the presence of a particular condition, for example, sensed motion exceeding a predetermined threshold.

Condition information may include trouble status or error status (e.g., an internal fault within the sensor), and/or communication fault (e.g., a fault in a network communication, QoS, etc.). The sensors 110 include an antenna for wireless communication, for example, radio frequency (RF) communication. The sensors 110 transmit a unique sensor identifier with the condition information to the sensor network 105 and to the IP camera 100. The IP camera 100 transmits control information back to the sensors 110. Again depending on the type of sensors 110, the control information includes information or commands to enable/disable the sensors 110, calibrate the sensors 110, update the firmware of the sensors 110, control the position of the sensors 110, etc. The IP camera 100 uses the condition information to control external systems 130 and 134 (shown schematically in FIG. 1) including, for example, a light switch, a siren, a recording device, an alarm, a valve controller, a load controller, and a load switch. Alternatively, in other embodiments, one of the sensors 100 is configured to coordinate the system. In such a system, one of the sensors 100 receives the condition information and controls external systems 130 and 134.

Integration of the sensors 110, sensor network, 105, and IP camera 100 provides a number of enhanced capabilities as compared to prior video surveillance systems. For example, the video information obtained by the IP camera 100 is supplemented by condition information from the sensors 110. Additional information increases the functionality of the video surveillance system by providing the video surveillance system with information outside of the current field of view of the IP camera 100. Since the IP camera 100 is configured to determine the position of the sensors 110, the video surveillance system can locate and track targets based on position information.

Figure 2:
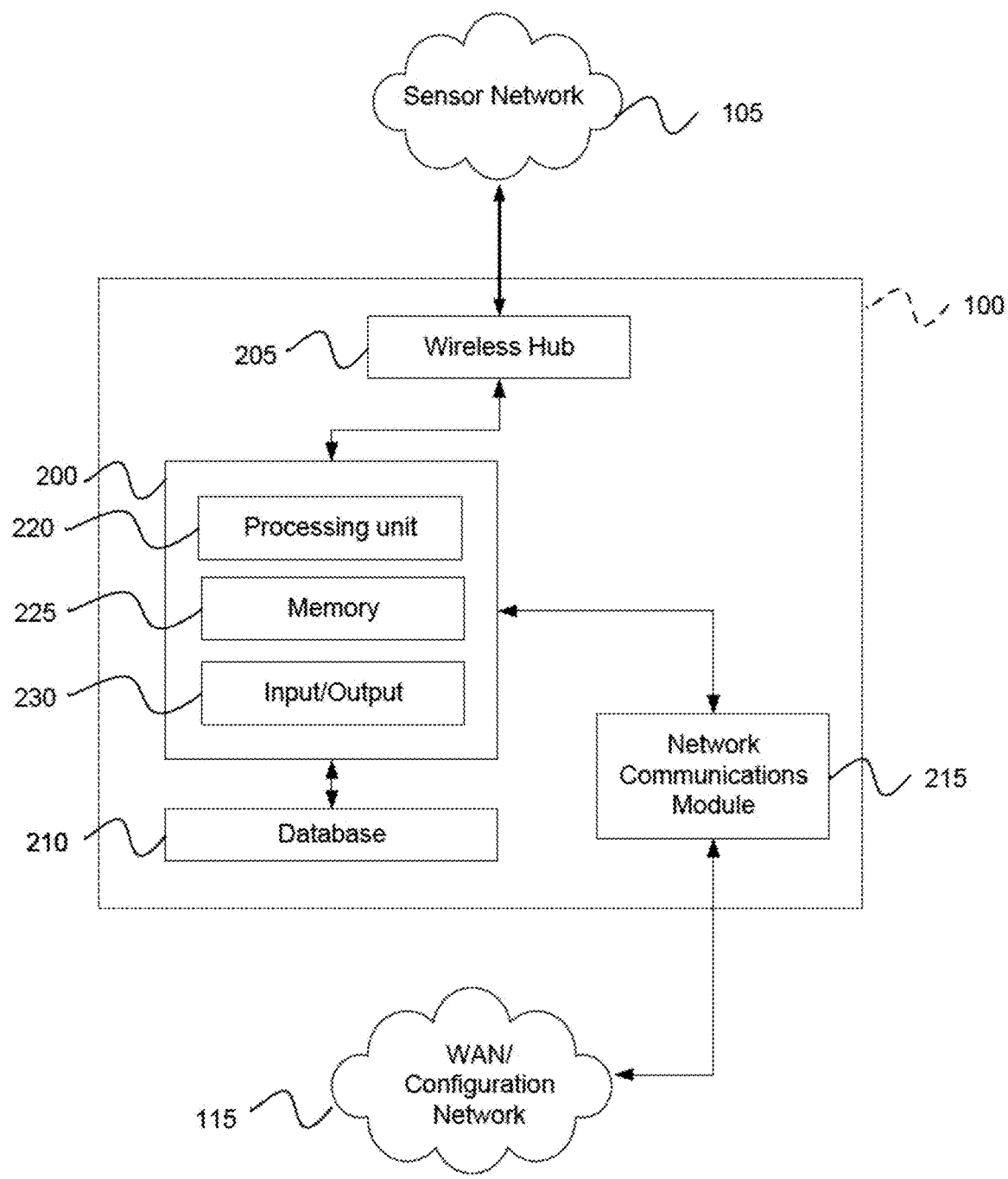
FIG. 2 is a block diagram illustrating components of the internet protocol camera of FIG. 1.

FIG. 2 illustrates the IP camera 100 of FIG. 1 in greater detail. A controller 200 is electrically connected and configured to communicate to a variety of modules or components of the IP camera 100. For example, the controller 200 is connected to a wireless hub 205, a database 210, and a network communications module 215. The controller 200 includes combinations of hardware and software that are operable to, among other things, control the operation of the IP camera 100; control pan, zoom, and tilt functions; control, calibrate, and reconfigure the sensors 110; reconfigure the IP camera 100; and control the database 210. In some constructions, the IP camera 100 is directly configurable and access through the second network 115 is not required to configure the IP camera 100. In some constructions, the IP camera 100 does not contain a database 210. The controller 200 may be located within the IP camera 100 or external to the IP camera 100. In some embodiments, the controller 200 includes a plurality of separate controllers. In this case, the plurality of controllers split up control functions for the surveillance system 50. For example, a camera controller may control the IP camera 100 and a position controller may control the positional awareness of the surveillance system 50, as further described below. The positional controller may be located within one of the sensors 110, within the IP camera 100, or in a stand-alone module.

In some embodiments, the controller 200 includes a plurality of electrical and electronic components that provide power, operational control, and protection to the components and modules within the controller 200 and/or IP camera 100. For example, the controller 200 includes, among other things, a processing unit 220 (e.g., a microprocessor, a microcontroller, or another suitable programmable device), a memory 225, and an input/output module 230. The processing unit 220, the memory 225, and the input/output module 230, as well as the various modules connected to the controller 200 are connected by one or more control and/or data buses. In some embodiments, the controller 200 is implemented partially or entirely on a semiconductor (e.g., a field-programmable gate array ["FPGA"] semiconductor) chip, such as a chip developed through a register transfer level ("RTL") design process.

The memory 225 includes, for example, a program storage area and a data storage area. The program storage area and the data storage area can include combinations of different types of memory, such as, for example, read-only memory ("ROM") or random access memory ("RAM"). The processing unit 220 is connected to the memory 225 and executes software instructions that are capable of being stored in a RAM of the memory 225 (e.g., during execution), a ROM of the memory 225 (e.g., on a generally permanent basis), or another non-transitory computer readable medium such as another memory or a disc. Software included in the implementation of the IP camera 100 can be stored in the memory 225 of the controller 200. The memory 225 is configured to store condition information and categorize the condition information by a type of information and by the time it is received. The software includes, for example, firmware, one or more applications, program data, filters, rules, one or more program modules, and other executable instructions. The controller 200 is configured to retrieve from memory 225 and execute, among other things, instructions related to the control processes and methods described herein. In other constructions, the controller 200 includes additional, fewer, or different components.

A power supply supplies a nominal AC or DC voltage to the controller 200 or other components or modules of the IP camera 100. The power supply is also configured to supply lower voltages to operate circuits and components within the controller 200 or IP camera 100. In other constructions, the controller 200 or other components and modules within the IP camera 100 are powered by one or more batteries or battery packs, or another grid-independent power source (e.g., a generator, a solar panel, etc.). Alternatively, the controller 200 may receive power through the second network 115. The second network may include, for example, a Power over Ethernet (PoE) system.

The network communications module 215 is configured to connect to and communicate through the second network 115. In some embodiments, the network is, for example, a wide area network ("WAN") (e.g., a TCP/IP based network or a cellular network). In some constructions, the IP camera 100 is configured with the network communications module 215 exterior to the IP camera 100. The network communications module 215 includes an IP server, which provides a webpage address that allows access to the IP camera 100 from any computer connected to the internet. In other constructions, the network communications module 215 is located external to the IP camera 100 and is communicable coupled to the IP camera 100. Additionally, the network hub 205 may be located internal to the IP camera 100 or be located externally to the IP camera 100. The wireless hub 205 includes, among other things, a microcontroller, a memory, and an RF antenna.

The sensor network 105 is, for example, a local area network ("LAN"), a neighborhood area network ("NAN"), a home area network ("HAN"), or personal area network ("PAN") employing any of a variety of communications protocols, such as Wi-Fi, Bluetooth, ZigBee, etc. Communications through the sensor network 105 can be protected using one or more encryption techniques, such as, for example, those techniques provided in the IEEE 802.1 standard for port-based network security. The sensor network 105 may operate in a mesh configuration or in a star configuration.

The second network 115 is connected through the network communications module 215. The connection may include, for example, wired connections, wireless connections, or a combination of wireless and wired connections. Similarly, the connections between the controller 200 and the configuration network or the network communications module 215 are wired connections, wireless connections, or a combination of wireless and wired connections. In some embodiments, the controller 200 or network communications module 215 includes one or more communications ports (e.g., Ethernet, serial advanced technology attachment ["SATA"], universal serial bus ["USB"], integrated drive electronics ["IDE"], etc.) for transferring, receiving, or storing data associated with the IP camera 100 or the operation of the IP camera 100.

The client device 120 is used to control or monitor the IP camera 100 and the sensors 110. For example, the client device 120 is operably coupled to the controller 200 to control the position of the IP camera 100, the scrolling of the IP camera 100, the configuration of the IP camera 100, etc. The client device 120 includes a combination of digital and analog input or output devices required to achieve a desired level of control and monitoring for the IP camera 100 and the sensors 110. For example, the client device 120 includes a display 120 and input devices. The client device 120 can also be configured to display conditions or data associated with the IP camera 100 or the sensors 110 in real-time or substantially real-time. For example, the client device 120 is configured to display the video stream of the IP camera 100, the status of the IP camera 100 and the sensors 110, the condition information and position information from the sensors 110, and the position information of the IP camera 100. In some constructions, the client device 120 is controlled in conjunction with the one or more indicators (e.g., LEDs, speakers, etc.) to provide visual or auditory indications of the status or conditions of the IP camera 100 or sensors 110.

Figure 3:
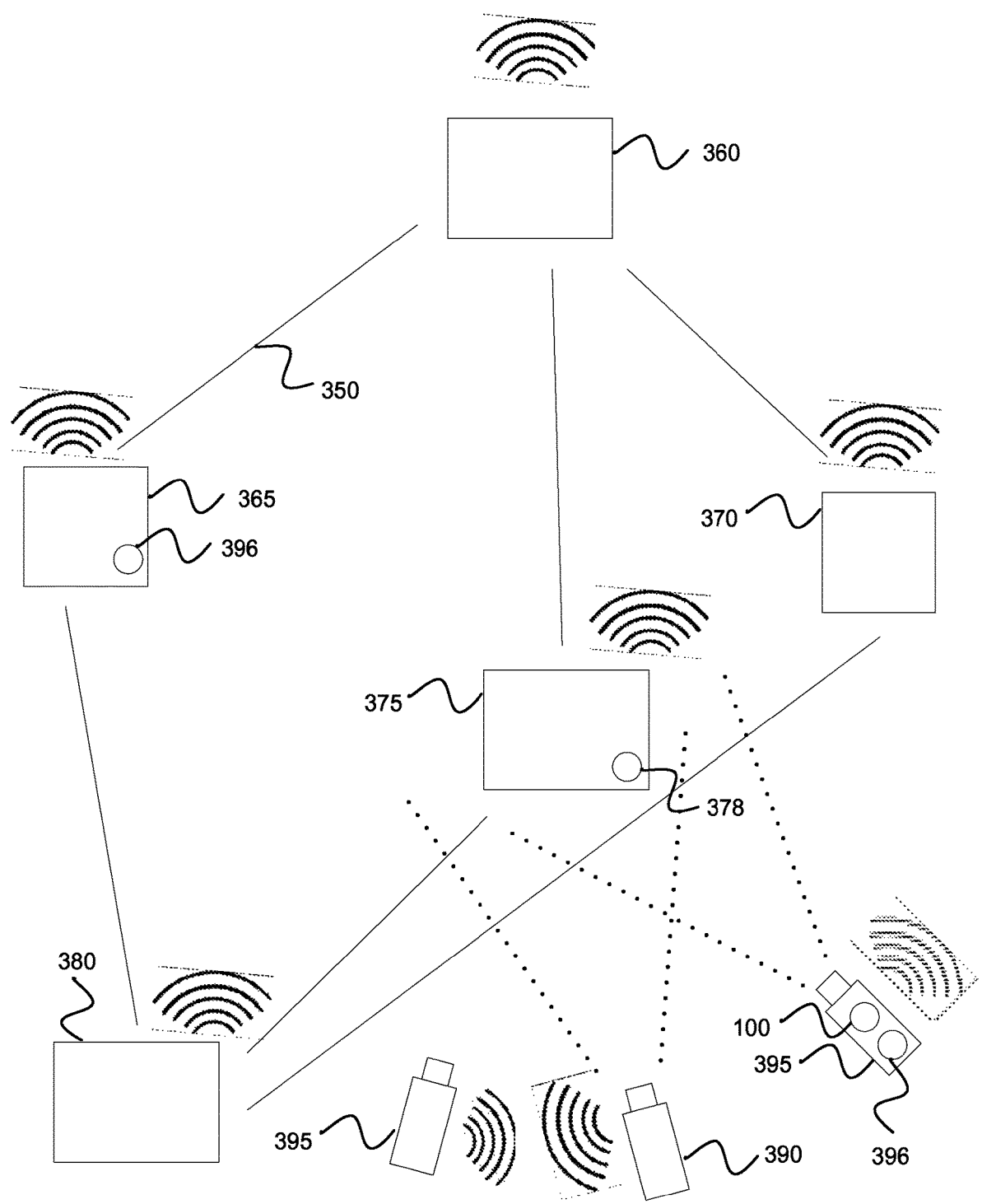
FIG. 3 is a block diagram illustrating an example of a positional arrangement for the sensor network of FIG. 1.

A diagram in FIG. 3 illustrates a positional awareness system provided by the sensor network 105, the sensors 110, and the IP camera 100 of FIG. 1. Positional awareness means that the IP camera 100 knows the location (i.e., distance and direction) of each one of the sensors 110 relative to itself. The positional awareness is stored in memory 225 as position information including a list of coordinates or a list of angles and distances. Each one of the sensors 110 acts as a node for determining position of the sensor network 105. For example, a sensor 360 is configured to transmit an RF message to the sensor network 105. The message includes frames and packets that communicate information such as, for example, a start of message, an address, the condition information, whether the sensor 360 is stationary or mobile, a time of the message, a time of the last location determination, and an end of message. Each one of the sensors 110 that is in range of the sensor 360 receives the transmitted message and may perform actions based on the message, such as repeating the message to the sensor network (and thus, effectively increasing the range of the sensor 360) or performing a timing calculation to determine position of the sensor 360. For example, a sensor 365, a sensor 370, and a sensor 375 are in the broadcast range of the sensor 360. However, sensor 380 and the IP camera 100 are not within the range. The sensors 365, 370, and 375 retransmit the message from the sensor 360 such that it is received by sensor 380 and the IP camera 100.

The surveillance system 50 determines the position of each of the sensors 110 with multilateration, trilateration, or triangulation techniques or a combination of these techniques. In multilateration, distance measurements are performed using RF signals and calculating a time to arrival for signals sent from synchronized transmitters. For example, the sensor 360, the sensor 365, the sensor 370, and the sensor 375 are time synchronized and transmit signals to the IP camera 100. The IP camera 100 measures a time difference of arrival of the signals from the sensors 360, 365, 370, and 375. Based on the differences in the time of arrival, the controller 200 determines the position of the sensors 360, 365, 370, and 375. In other embodiments, the IP camera 100 is time synchronized with the sensors 360, 365, 370, and 375, thus allowing the positions to be calculated with less information. In some embodiments, one or more sensors 110 provide conditional information without the need of positional determination.

The surveillance system 50 may also include software and hardware to perform a trilateration technique in determining the location of the sensors 110. For example, the IP camera 100, a second IP camera 390, and a third IP camera 395 may include a direction finding antenna that can measure an angle of incidence (i.e., an angle of arrival) of the RF signal from the sensor 360 to each IP camera 100, 390, 395. In one embodiment, the IP camera 100 and the sensor 360 are time synchronized. In this case, the controller 200 determines the distance between the IP camera 100 and the sensor 360 using the time to arrival or the time of flight of the RF signal. In other embodiments, the IP camera 100 and the sensor 360 are not time synchronized. In these cases, other means are used to determine the distance between the IP camera 100 and the sensor 360. For example, the IP camera 100 can measure a power level of the received RF signals and determine a received signal strength indicator (RSSI). The power level of the RF signal as received by the IP camera 100 can be used to determine relative distances from the sensor 360 to the IP camera 100 since the power level of the RF signal will decrease with distance. Once the angles of incidence and the distances are determined, a location of the sensor 360 relative to each of the IP cameras 100, 390, and 395 is determined.

The surveillance system 50 may also include software and hardware to perform an angle of incidence measurement using the camera image of the IP camera 100 For example, the sensor 375 may include a light emitting diode (LED) 378 positioned within a range of the field of view of the IP camera 100. The LED 378 is controlled on and off by the IP camera 100 as the IP camera pans and/or tilts searching for the LED 378. Once the LED 378 is detected, the IP camera 100 determines azimuth and altitude angles from a reference origin of the IP camera 100 and stores the azimuth and altitude angles in memory 225. The second IP camera 100 may also be positioned with a field of view that includes the LED 378. The second IP camera 390 may also determine azimuth and altitude angles of the LED 378 from a reference origin. The IP camera 100 may also be equipped with a compass 395 to aid in the determination of the azimuth angle of the LED 378. In this case, the azimuth angle is measured with respect to magnetic north. A distance between the IP camera 100 and the sensor 375 may be found using the techniques as described above. Conversely, a distance between the IP camera 100 and the IP camera 390 can be determined based on a GPS location enabled by a GPS locator on each of the IP cameras 100, 390. The IP camera 100 uses the distance between the IP cameras 100, 390 and the angles of incidence to determine a position of the LED 378 and thus, determines a position of the sensor 375.

For illustration, the nodes A, B, and C represent the sensors 110, as shown below. The controller 200 is able to use triangulation to determine the distance between B and C once the angles beta and alpha are known as illustrated below.

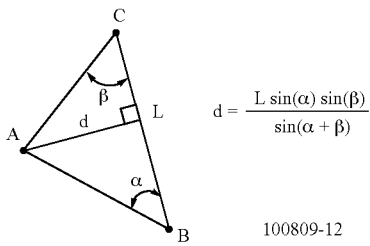

100809-12

In some embodiments, the LED method allows the controller 200 to determine the angles α and β, and thus, the direction of A, B, and C. The controller 200 uses trilateration to measure the RSSI or time to arrival of the RF signals from A, B, and C. Therefore with triangulation and trilateration, the IP camera 100 will know both the distance and the direction to each node A, B, and C. It should be noted that using trilateration by itself would provide angles and distance if nodes A, B, and C all measure the RSSI (i.e., RSSI of A to C, RSSI of B to C, RSSI of B to A, RSSI of C to A, RSSI of A to B, and RSSI of C to B). From the RSSI values, one node (e.g., A) can calculate all the angles between the nodes A, B, and C.

The techniques of multilateration, trilateration, and triangulation may be performed in various combinations based on the particular needs of the surveillance system 50. For example, the IP camera 100 may use the LED on the sensor 360 to determine a direction to the sensor 360 and use multilateration to determine a distance to the sensor 360, thus determining position. Similarly, trilateration can determine a direction to the sensor 360 from the IP camera 100 and multilateration can determine the distance. Thus various combinations of multilateration, trilateration, and triangulation may be used to determine position of the sensors 110 by first determining the direction or distance to each of the sensors 110. Depending on the combination of techniques used in a particular application, the surveillance system 50 can achieve positional awareness with two or more devices (e.g., the sensor 360 and the IP camera 100). As additional sensors 110 or IP cameras 100, 390, 395 are added to the surveillance system 50, positional awareness may become more accurate since the IP camera 100 performs additional location determinations. These techniques may be combined to create redundancy in the surveillance system 50. Additionally, the positional awareness, as determined by the controller 200, is made more robust since it mitigates potential multipath issues for an indoor/outdoor environment.

In some embodiments, the IP camera 100 is equipped with a GPS location device 396. This enables the IP camera 100 the ability to geo-locate itself, and based on the position information, geo-locate the sensors 110. The sensors 110 may also be equipped with a GPS location device 396. The GPS location device 396 can be used to determine the position of the sensor 360 if the controller 200 fails to detect the position of the sensor 360. A failure to detect the position of the sensor 360 could occur because the sensor 360 is not in range of an adequate number of sensors 110 to acquire the position information. The GPS device 396 in the sensor 360 could also be used to geo-locate the IP camera 100 or the other sensors 110.

Figure 4:
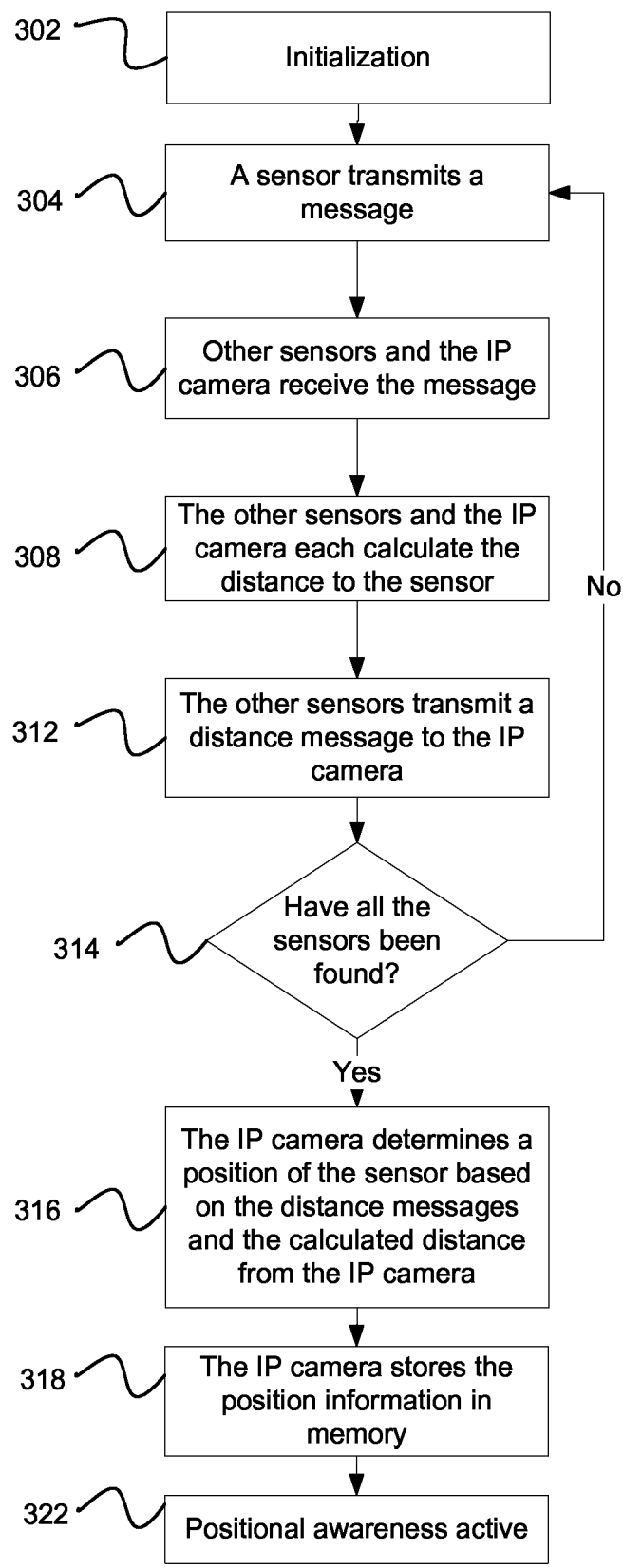
FIG. 4 is a flow chart illustrating a method of performing positional awareness for the surveillance system of FIG. 1.

The positional awareness of the surveillance system 50 can be determined on initialization of the surveillance system 50, on a periodic basis, or on the occurrence of an event (e.g., motion detection, or glass breaking) that is detected by one of the sensors 110. FIG. 4 illustrates a flowchart of an embodiment of a method of determining positional awareness for the surveillance system 50 on system initialization. The method is started after installation of the IP camera 100 or the sensors 110. The method can be triggered on power-up of one or more of the sensors 110 or the IP camera 100. Alternatively, the method may be performed periodically, for example, on a programmed schedule. On power-up of the IP camera 100 and the sensors 110, the system initializes (step 302). A sensor 360 transmits a message to the sensor network 105 (step 304). Sensors 110 and the IP camera 100 in range of the sensor 360 receive the message (step 306). The sensors 110 and the IP camera 100 calculate the distance between themselves and the sensor 360 (step 308). The sensors 110 transmit a distance message to the IP camera 100 (step 312). Repeat step 304 through step 312 until each of the sensors 110 has calculated the distance to the other sensors 110 (step 314). When each of the sensors 110 has calculated the distance to the other sensors 110 and transmitted the distance message to the IP camera 100, the IP camera determines the position of each of the sensors 110 based on the distance messages and, if available, the distance from the IP camera 100 (step 316). The IP camera 100 stores the position information in the memory 225 or the database 210 (step 318). Upon detection of an event by the sensors 110, the IP camera 100 references the position information to determine the location of the event (step 322).

Figure 5:
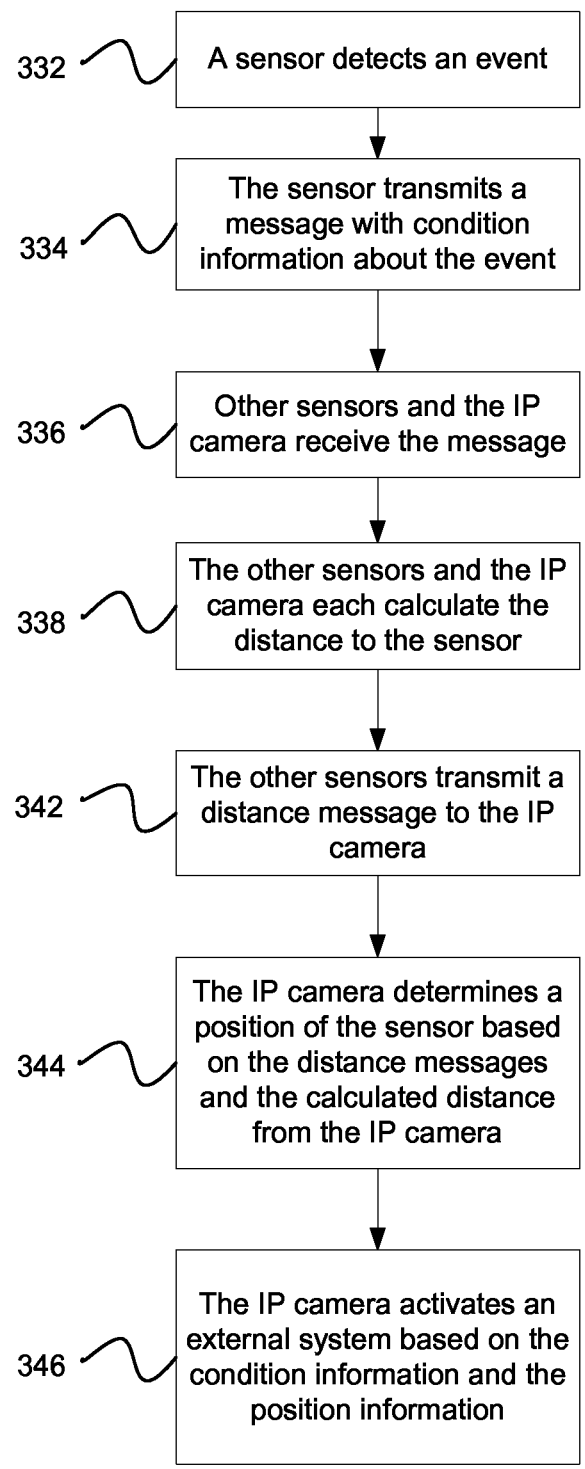
FIG. 5 is a flowchart illustrating a method of responding to an event by the sensor network of FIG. 3.

FIG. 5 illustrates a flowchart for a method of determining the position of a sensor 360 on an occurrence of an event of interest and activating an external system. When a sensor 360 detects an event (step 360), a sensor 360 transmits a message to the sensor network 105 (step 334). Sensors 110 and the IP camera 100 in range of the sensor 360 receive the message (step 336). The sensors 110 and the IP camera 100 calculate the distance between themselves and the sensor 360 (step 338). The sensors 110 transmit a distance message to the IP camera 100 (step 342). The IP camera 100 determines the position of each of the sensors 110 based on the distance messages and, if available, the calculated distance from the IP camera 100 (step 344). The IP camera 100, if in range, positions its field of view on the determined location of the event based on the location of the sensor and activates an external system based on the condition information and the location information (step 318).

If the sensor 360 detects an event, the IP camera 100 can locate the event by referencing the location of the sensor 360 in the memory 225. For example, in an alarm system, sensor 360 may include a motion sensor that detects movement indicative of an alarm condition. When condition information (e.g., the motion sensed) from the sensor 360 reaches the IP camera 100, the IP camera 100 is configured to position its field of view to the location of the sensor 360. Then, the IP camera 100 can confirm an alarm condition and transmit an alarm signal through the second network 115 or the sensor network 105. The sensors 110 are configured to detect a variety of events such as, for example, motion detection, glass breaking, biological threshold breach, radiological threshold breach, audio alarm, sonar sensor threshold breach, etc.

The IP camera 100 is configured to use multiple sensors 110 to locate an event. For example, if an event occurs between sensor 375 and sensor 380, the IP camera 100 determines the position of the event based on the condition information from sensor 375 and sensor 380 and on the location of the sensor 375 and the sensor 380 in the positional awareness system. If an event triggers sensor 375, then triggers sensor 380, the location of the event can be determined by positioning the field of view of the IP camera 100 at the location where a ranges of the sensor 375 and the sensor 380 intersect.

Figure 6:
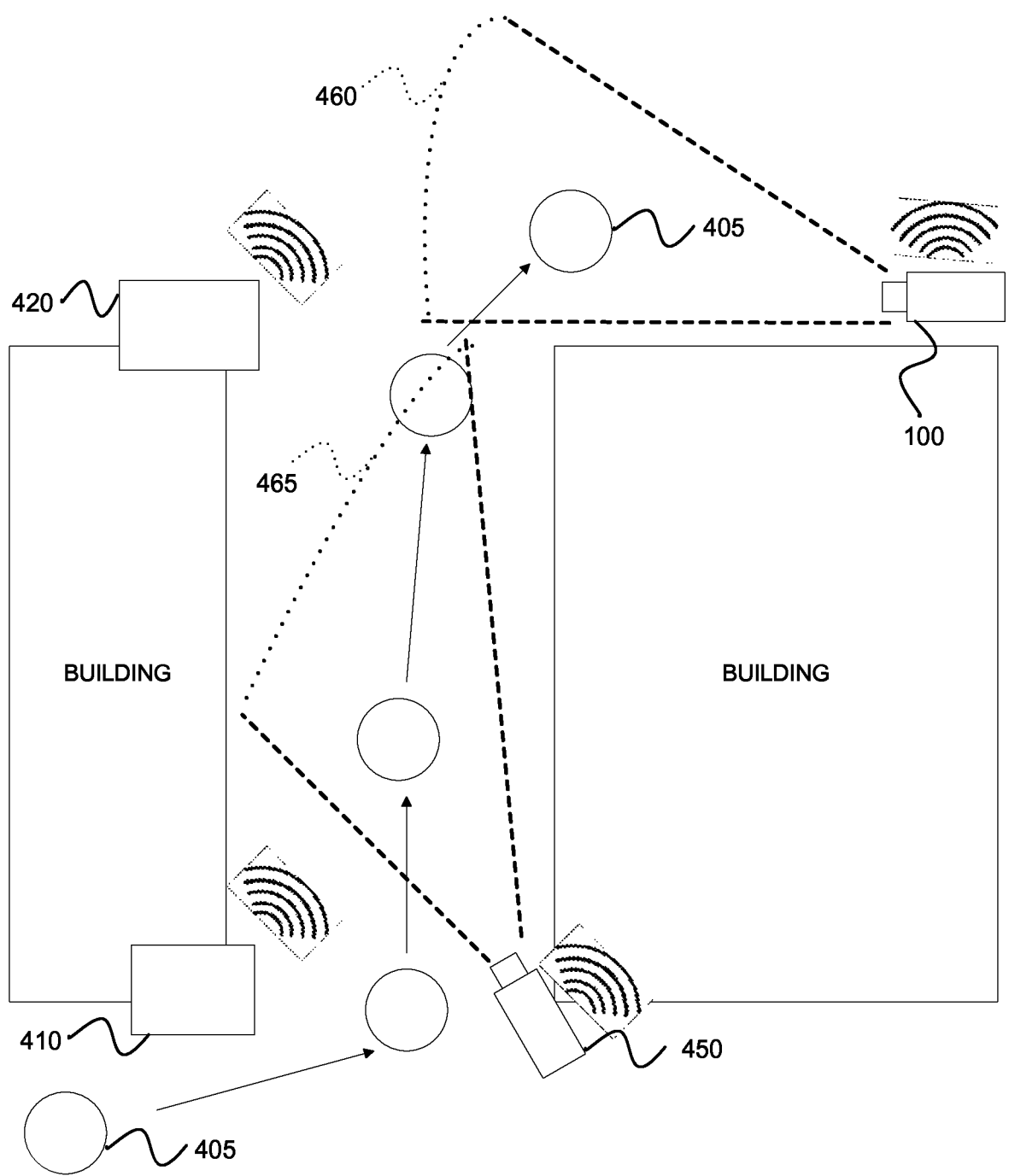
FIG. 6 is a block diagram illustrating handoff of target tracking from an IP camera to the IP camera of FIG. 1, based on positional awareness.

Another feature of the surveillance system 50 is the ability to track targets with the IP camera 100 and the sensors 110, as shown by the diagram of FIG. 6. In this embodiment, the IP camera 100, a secondary camera 450, a sensor 410, and a sensor 420 coordinate to track a target 405. The sensor 410 detects the motion of the target 405 before the target 405 enters into the field of view 465 of the secondary camera 450. The sensor 410 is configured to track the target using a velocity of the target 405, a distance between the target 405 and itself, a vector of the target 405, or an azimuth of the target 405. The secondary camera 450 receives condition information containing this information from the sensor 410. The secondary camera 450 transmits a request to receive position information from the IP camera 100. The IP camera receives the condition information from the sensor 410 (or through a repeater if out of range) and the request for position information. The IP camera 100 transmits the position information to the secondary camera 450 through the sensor network 105. The secondary camera 450 determines a position of the target 405 relative to itself based on the position information. The secondary camera 450 determines from which direction or angle the target 405 is approaching and when the target will enter the field of view of the secondary camera 450. The secondary camera 450 adjusts its field of view 465 accordingly and tracks the target using internal controls.

As the target 405 advances, the secondary camera 450 tracks the target 405 by positioning its field of view 465 such that the target 405 remains in a center of the field of view 465. The IP camera 100 receives the condition information from the secondary camera 450 and determines the position of the target 405. When the target 405 approaches the edge of the field of view 465 of the secondary camera 450, the IP camera 100 is positioned with its field of view 460 at the edge of the field of view 465 of the secondary camera 450. This allows for a smooth handoff of the tracking of the target 405 to the IP camera 100. The target tracking may be extended to more than two cameras so that the target 405 is tracked through a plurality of cameras.

In an alternative embodiment, the IP camera broadcasts the position information of the sensors 110 before an event of interest occurs. The sensors 110 and the secondary camera 450 receive the position information and store the position information in memory. On the occurrence of an event, such as a target 405 entering the range of the sensor 410, the secondary camera 450 and the sensor 410 perform target tracking and handoff of the target 450 without the intervening step of receiving position information from the IP camera 100.

A sensor 420 may assist in the handoff between the secondary camera 450 and the IP camera 100. As the target 405 reaches the edge of the field of view 465 of the secondary camera 450 and enters the range of the sensor 420, the sensor 420 tracks the target 405. The IP camera 100 uses the position information to determine the position of the target 405 based on the condition information from the sensor 420. The IP camera 100 positions its field of view 460 based on the information provided by the sensor 420. This functionality can provide redundancy to the surveillance system 50 and can provide the surveillance system 50 the ability to track targets between the fields of view of the cameras.

Figure 7:
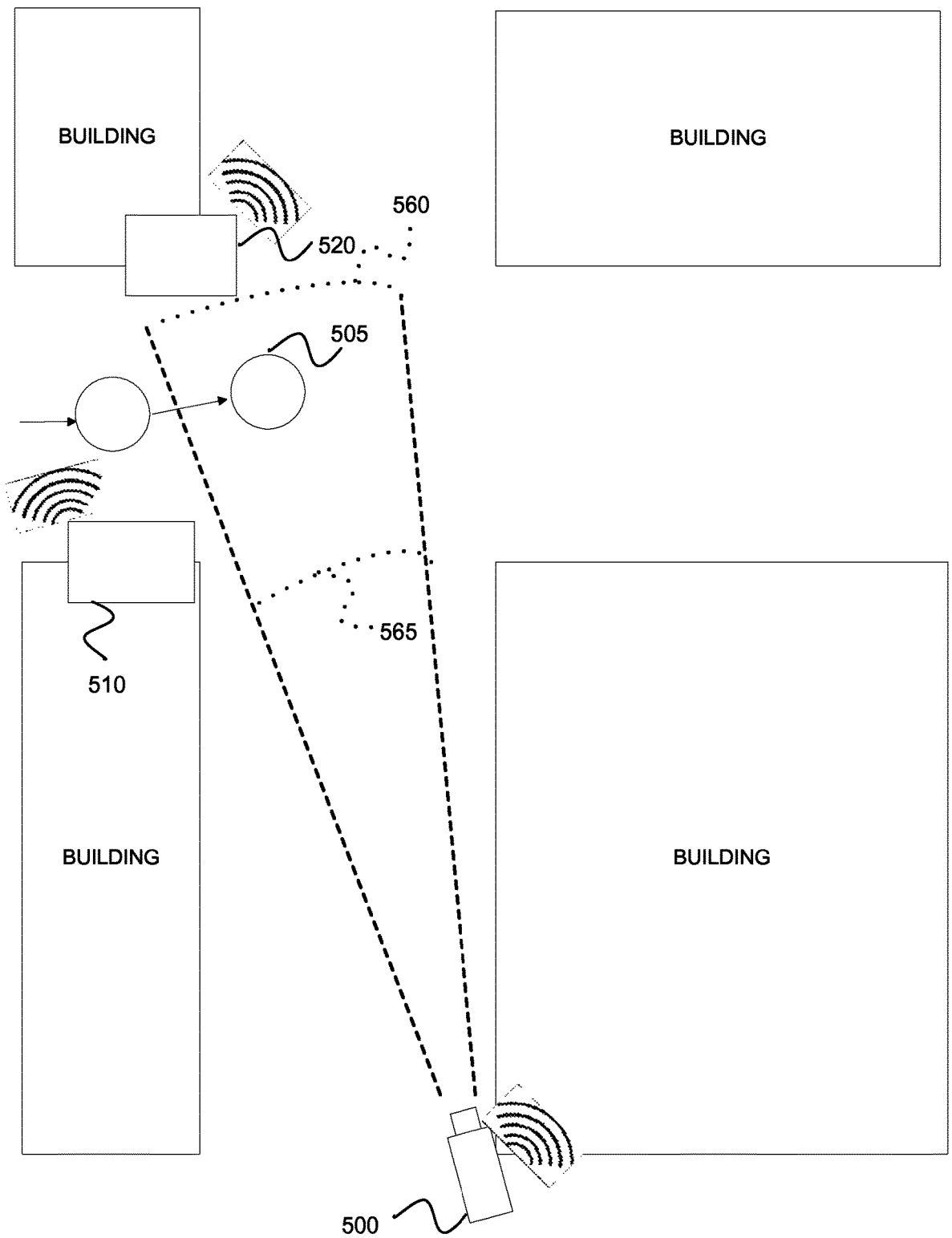
FIG. 7 is a block diagram illustrating an increased field of view of the IP camera of FIG. 1.

Another embodiment improves surveillance at night, as shown in FIG. 7. The IP camera 100 controls a light controller 520 through the sensor network 105 based condition information from a motion sensor 510. As a target 505 enters the range of the motion sensor 510, the motion sensor 510 transmits condition information to the IP camera 100, thus alerting the IP camera 100 of the presence of a target 505. The IP camera 100 signals the light controller 520 to activate lights. At night, the field of view 565 of the IP camera 100 is limited. By activating lights, the field of view 560 is extended, and thus allows the IP camera 100 to track a target 505 outside of the field of view 565 without lights.

Figure 8:
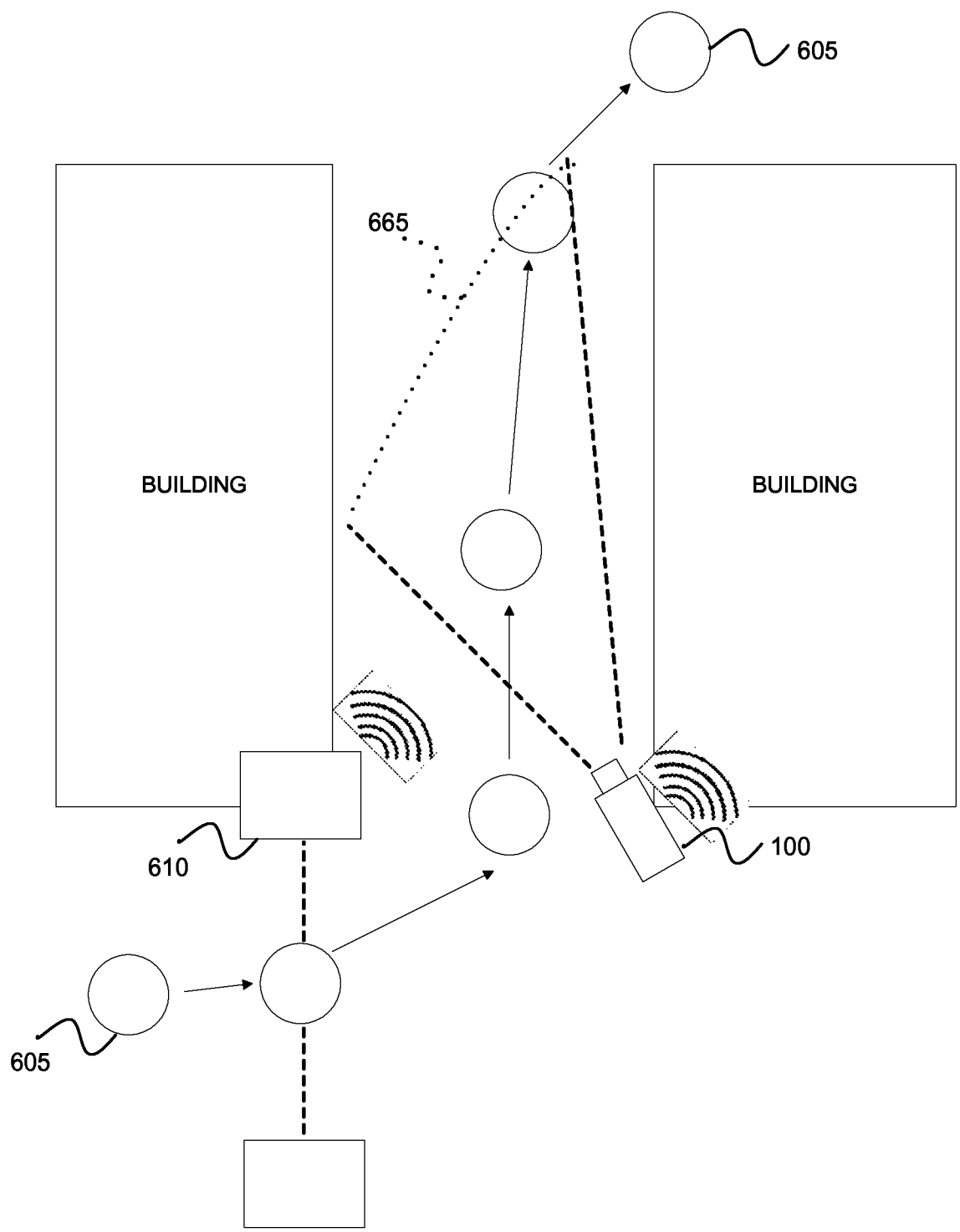
FIG. 8 is a block diagram illustrating the IP camera of FIG. 1 obtaining a target based on a perimeter crossing.

In yet another embodiment, a photo eye sensor 610 detects a target 605 crossing a point of interest, as shown in FIG. 8. The photo eye sensor 610 transmits the condition information indicative of the presence of a target 605. The IP camera 100 pans, zooms, and tilts to acquire the target 605 in its field of view based on the position information of the photo eye sensor 610. The IP camera 100 is then able to track the target 605. This allows a low-cost method of monitoring a location. Once the photo eye sensor is installed, the surveillance system 50 automatically determines its position without requiring additional programing.

Figure 9:
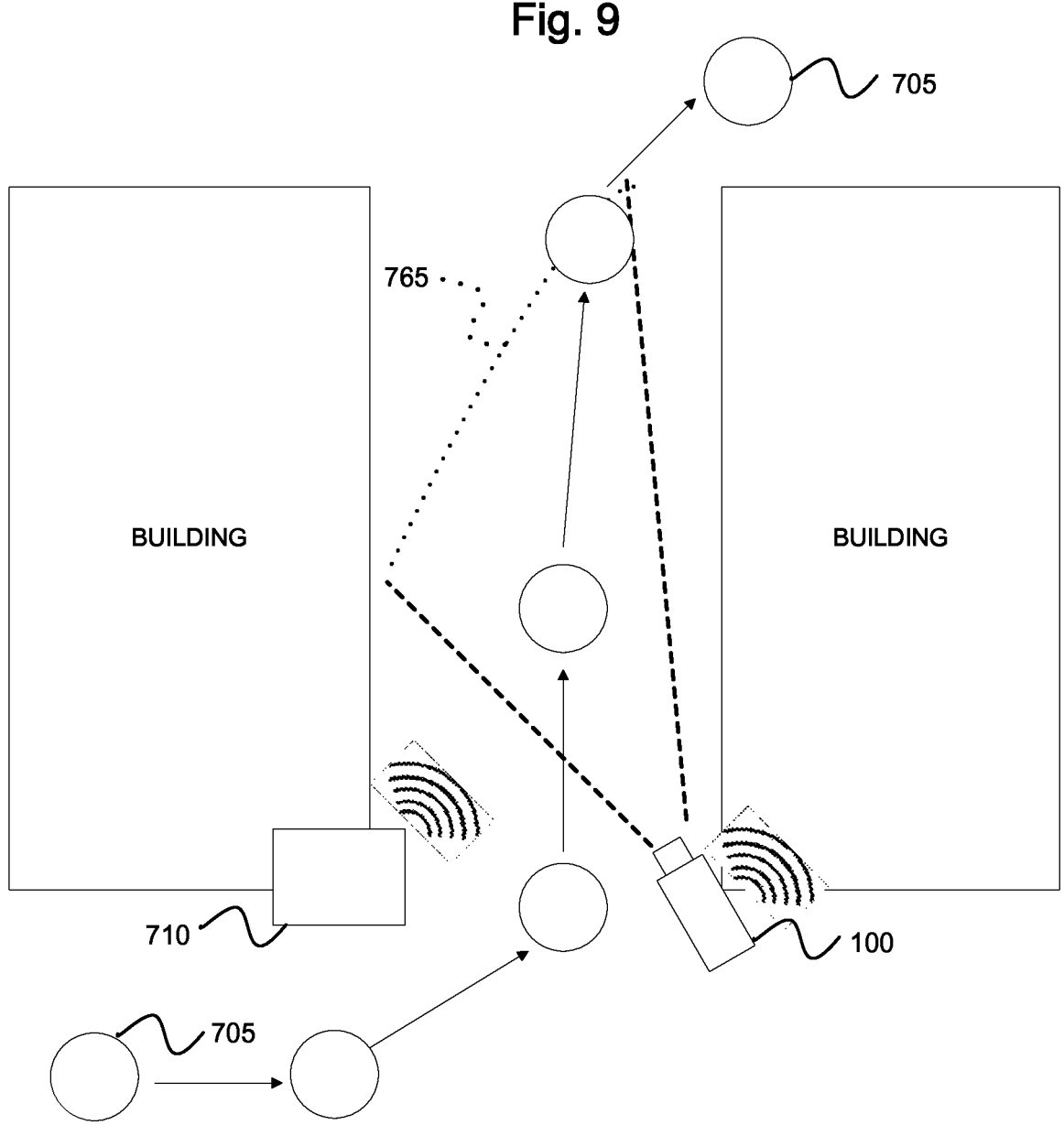
FIG. 9 is a block diagram illustrating the IP camera of FIG. 1 obtaining a target based on the position of a motion detector.

In a similar embodiment, the IP camera 100 is programmed in real-time via the GUI 120 to acquire a target wearing a specific color. For example, in FIG. 9, the IP camera 100 is configured to detect and track a target 705 that is wearing a red shirt. The IP camera 100 reconfigures a sensor 710, a color sensor or a camera, to detect red. When the target 705, which is wearing a red shirt, enters the field of view of the sensor 710, the sensor 710 transmits condition information to the IP camera 100 indicating that the color red is being detected. The IP camera 100 pans, zooms, and tilts to acquire the target 705 in the field of view 765 of the IP camera 100 based on the position information.

Figure 10:
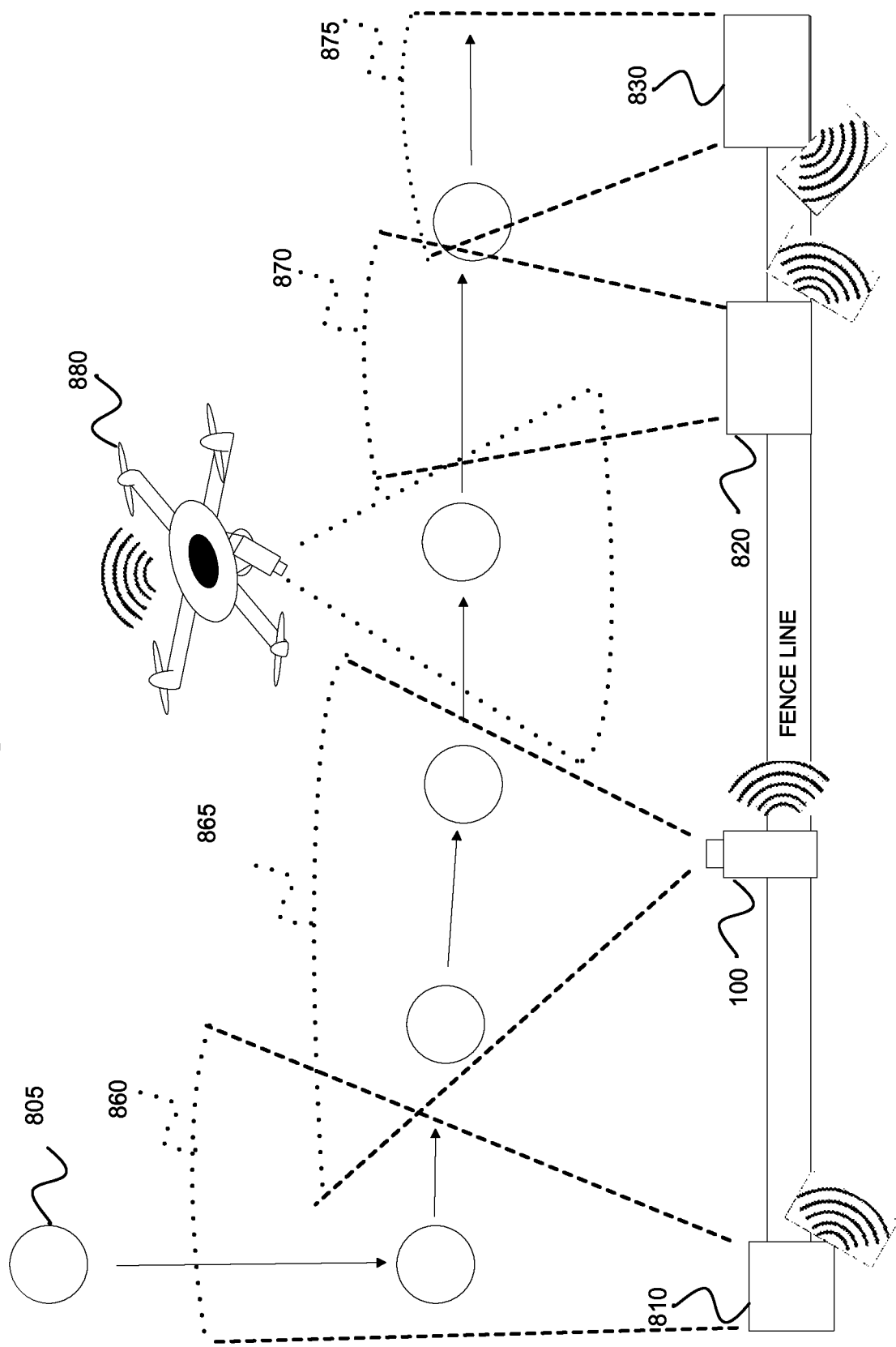
FIG. 10 is a block diagram illustrating a handoff of target tracking from the IP camera of FIG. 1 to a camera mounted on a drone.

FIG. 10 illustrates an embodiment where a target 805 is acquired and tracked by multiple cameras and sensors along a fence line. As the target 805 approaches the fence line, a proximity sensor 810 senses the target 805 within the field of view 860. The proximity sensor 810 transmits condition information to the IP camera 100 indicating that a target 805 has been detected. The IP camera 100 pans, zooms, and tilts to acquire the target 805 in the field of view 865 of the IP camera 100 based on the position information of the proximity sensor 810. The IP camera 100 tracks the target 805 by maintaining the field of view 865 on the target 805. When the target 805 nears the edge of the field of view 865, the IP camera 100 transmits condition information and position information of the target 805, to an automated drone 880. The automated drone 880 then tracks the target 805 with its own sensors. For example, the automated drone 880 includes a video camera with tracking capability. As the target 805 moves along the fence line, sensors 820, 830 detect the target 805. The sensors 820, 830 transmit the condition information to the IP camera 100 and to the automated drone 880, and the IP camera continues to transmit position information. This provides the automated drone 880 with updated condition information and position information of the target 805 to enhance the automated drone's tracking capability. Thus, continuously updated condition information and position information allows for a smooth transition from camera to camera and sensor to sensor by providing accurate information about the target 805. In some embodiments, the IP camera 100 includes a controller for the automated drone 880 and transmits control signals to the automated drone 880. The IP camera 100 can be configured to dispatch the automated drone 880 based on the occurrence of an event including the target 805 nearing an edge of the field of view 865 of the IP camera 100.

Figure 11:
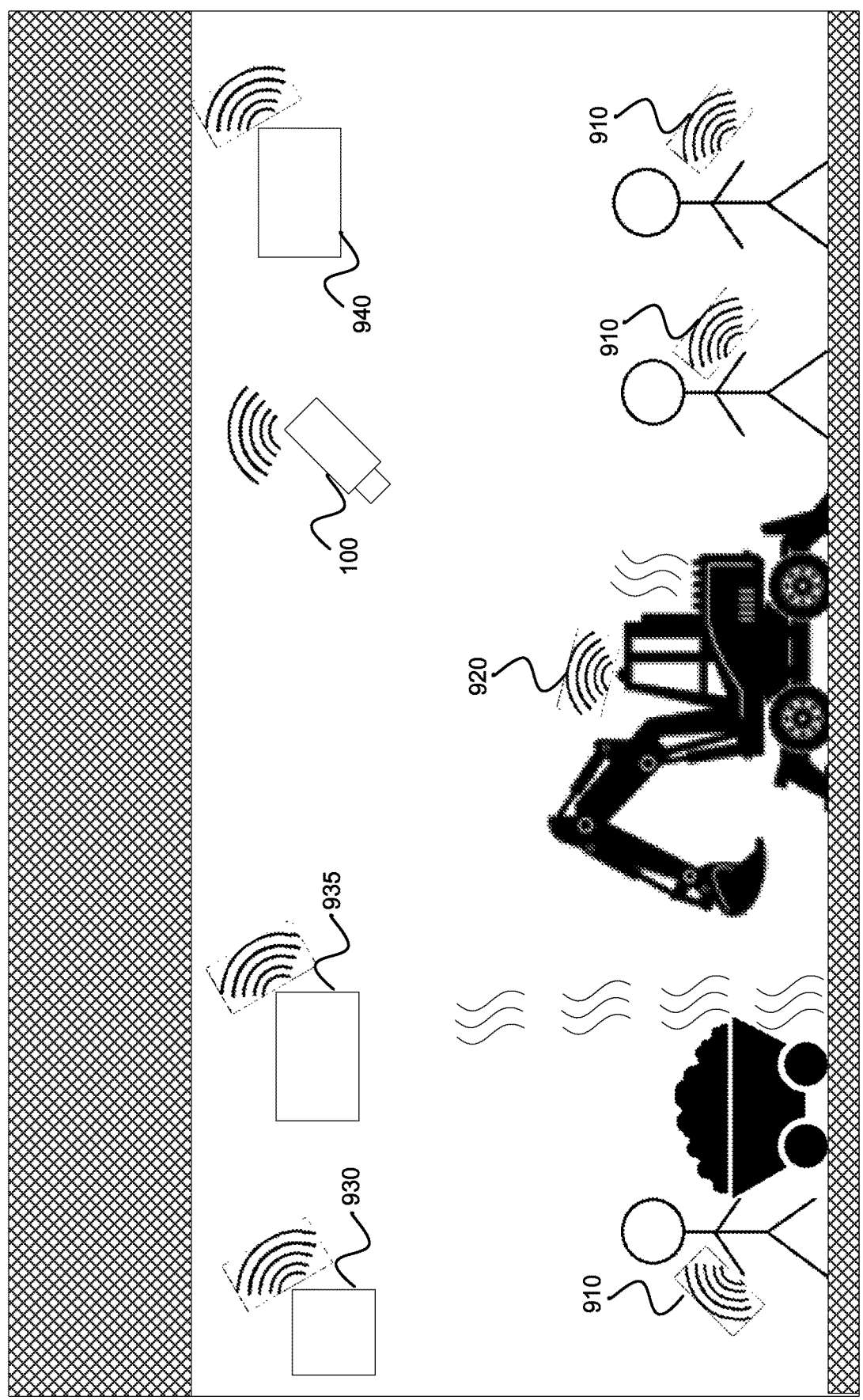
FIG. 11 is a block diagram illustrating an application of the surveillance system of FIG. 1.

In yet another embodiment, the IP camera 100 provides surveillance for a mining operation, as shown in FIG. 11. Using the positional awareness of the surveillance system 50, the IP camera 100 provides coordination between sensors, cameras, and personnel. For example, miners are provided with a biometric sensor 910 and mining equipment is provided with a sensor 920. The IP camera 100 stores the position information of each sensor 910, 920, 930, 935, 940 in memory 225. The IP camera 100, through the sensor network 105, is wirelessly connected to various safety sensors, for example, a flammable gas sensor 930, a toxic gas sensor 935, and a radiation sensor 940. This embodiment, as well as others, includes additional sensors to measure conditions such as carbon dioxide levels, carbon monoxide levels, oxygen levels, temperature, chemical levels, sound levels, etc. The IP camera 100 continuously updates the position information in the memory 225 as the sensors 910, 920 change locations. If a hazardous condition is detected, the IP camera 100 determines the position of the hazard from the position information, and activates the external systems 130. The IP camera 100 may be configured to sound an evacuation alarm, activate or deactivate ventilation systems, shutdown equipment, etc. In this embodiment, (and other embodiments with mobile sensors) the IP camera 100 receives a rapid, periodic message with the condition information from the sensors 910, 920. The IP camera 100 determines the position information on receiving each rapid, periodic message. If the IP camera 100 determines that a miner has entered an improper location, the IP camera 100 can activate an external system 130 such as sounding an alert or notifying specified personnel through a wireless device. The biometric sensor 910 transmits the condition information including biometric information to the IP camera 100. If a threshold is exceeded for a biometric, the IP camera 100 transmits a wireless notification to medical personnel.

The embodiment in FIG. 11 may extend to other industries to provide safety and security. For example, the surveillance system 50 can be deployed on an oil rig to monitor various conditions. In this embodiment, sensors 110 monitor weather conditions such as wind, approaching storms, rain, etc. If a dangerous condition is present, the IP camera 100 alerts personnel. The IP camera 100 may also activate an external system 130 based on the type of weather condition. The biometric sensor 910 can indicate if a worker is experiencing physiological conditions above a safe level or indicate that the worker has entered into an unsafe location. For example, the signal from the biometric sensor 910 may indicate that the worker fell off the oil rig and into the water. The IP camera 100 activates an external system 130 such as a man-overboard warning. Other sensors 110 provide structural integrity or vibration information from the oil rig's platform. The IP camera 100 communicates with these sensors 110 and may dispatch a drone to a location of the sensors 110 to obtain video of a difficult to access or hazardous location.

Figure 12:
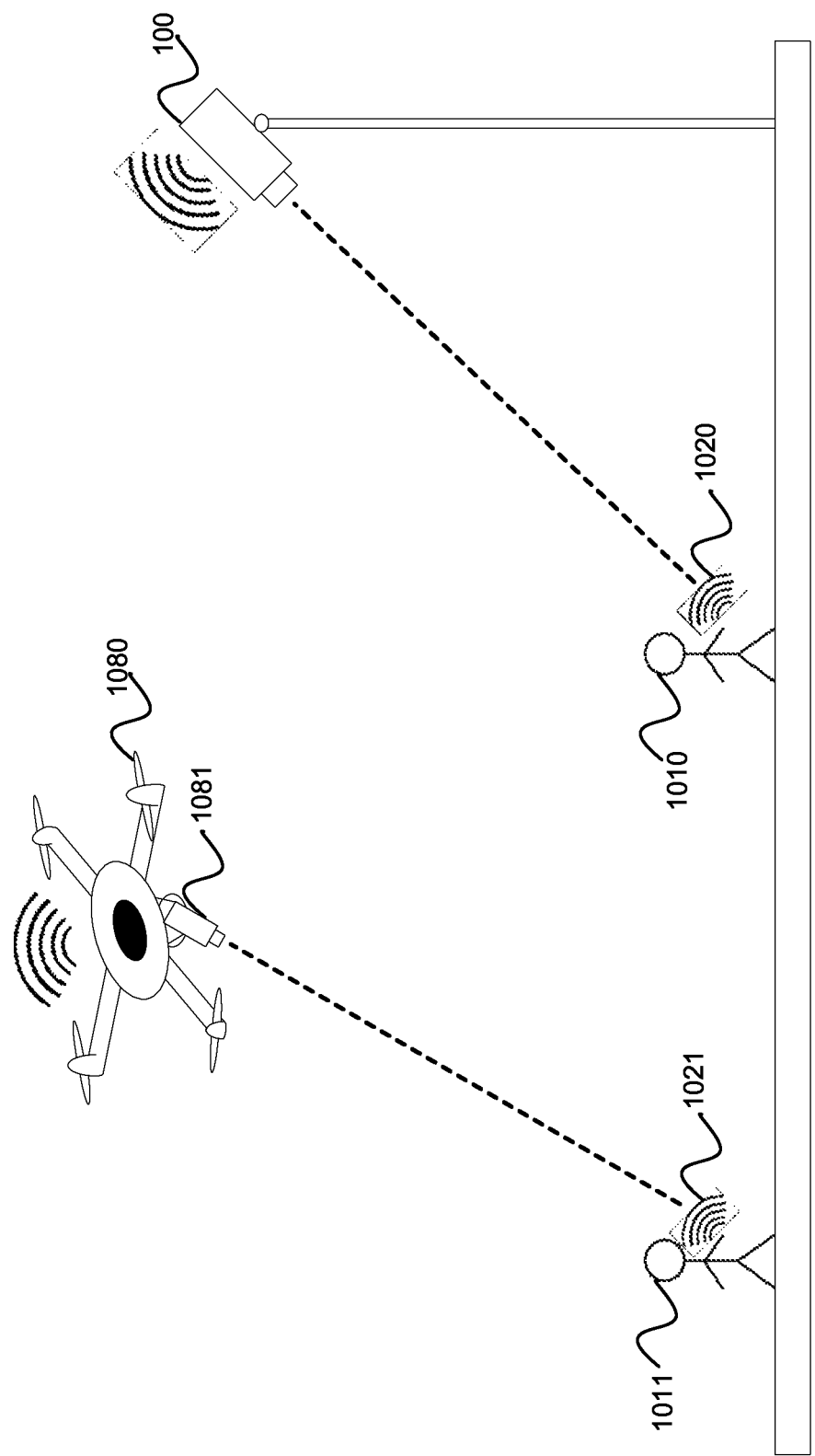
FIG. 12 is a block diagram illustrating a technique for tracking a sensor with the IP camera of FIG. 1.

FIG. 12 illustrates another embodiment that uses positional awareness to track a person. A person 1010 is equipped with a sensor 1020, which is in communication with the IP camera 100. The IP camera 100 determines the location of the sensor 1020 by using at least one of the multilateration, trilateration, and triangulation techniques described above. Based on the distance and angle of the sensor 1020 from the IP camera, the IP camera 100 tracks the sensor 1020 with pan, zoom, and tilt functions and without requiring video recognition and tracking software in the IP camera 100. Similarly, a person 1011 with a sensor 1021 may be tracked by a drone 1080. In this example, the drone 1080 determines the location of the sensor 1021 by using at least one of the multilateration, trilateration, and triangulation techniques. Once the position of the sensor 1021 is known relative to the drone 1080, the drone is able to track the sensor 1021 without requiring video recognition and tracking software in the drone 1080. The drone 1080 may be programmed to maintain a set distance or a set elevation from the sensor 1021.

Figure 13:
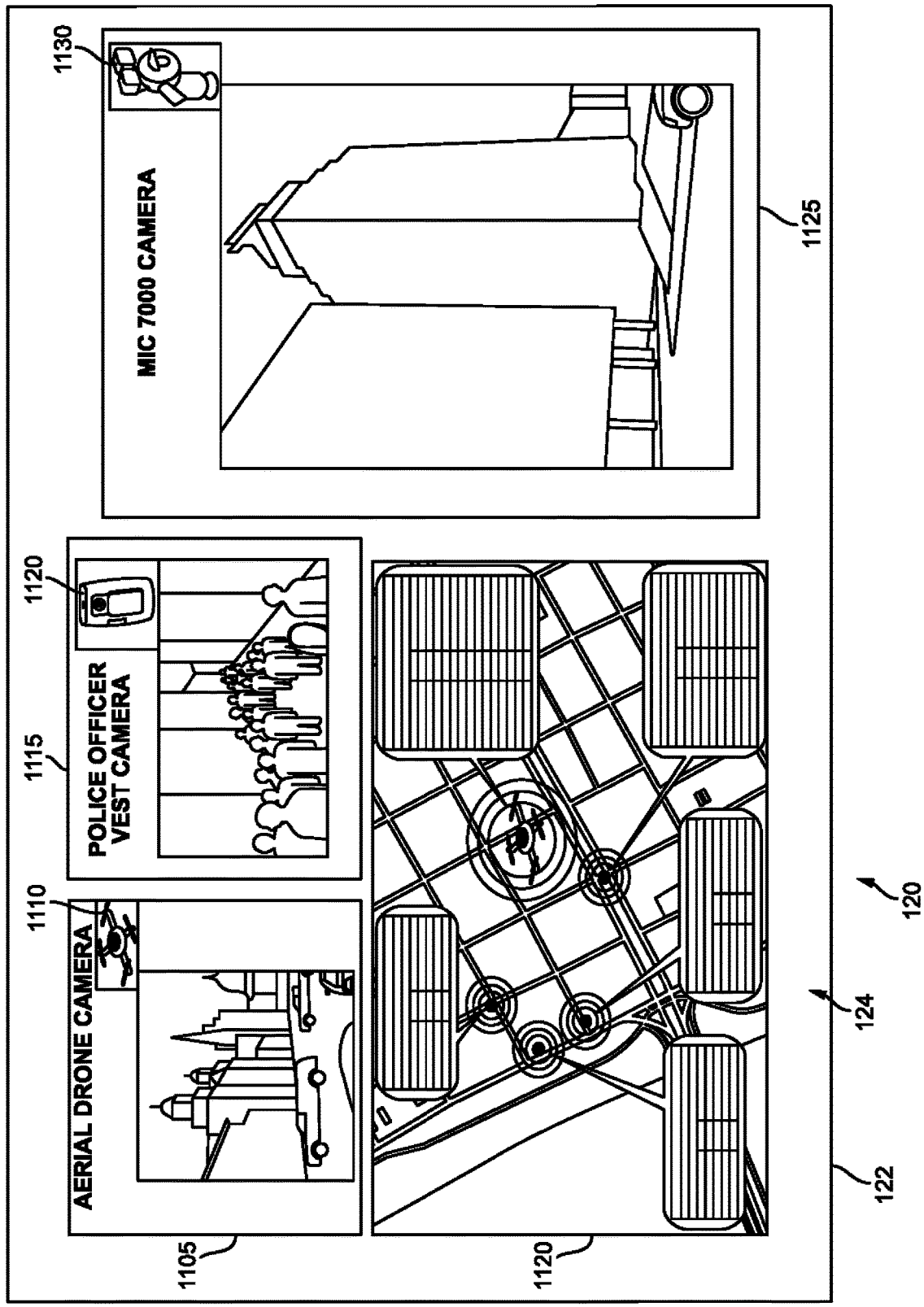
FIG. 13 is an illustration of the graphical user interface of FIG. 1

FIG. 13 illustrates one embodiment of the display 122 on the client device 120. The display 122 includes the GUI 124, which allows a user to open and close windows on the display 122. The display 122 is configured to display information from various sources including a video feed 1105 from an aerial drone camera 1110, a video feed 1115 from a police officer vest camera 1120, and a video feed 1125 from a street-view camera 1130. Additionally, the client device 120 is configured to display a map 1135 that indicates, among other things, the locations of the aerial drone camera 1110, the police officer vest camera 1115, and the street-view camera 1120. The video feeds 1105, 1115, 1125 are routed through the controller 200 and sent via the second network 115 to the client device 120. The video feeds 1105, 1115, 1125 may include real-time video or video that is stored in the controller 200. The display 122 is configurable to display one or more of the video feeds 1105, 1115, 1125 and to resize the displayed video feeds 1105, 1115, 1125 as desired by the user.

Figure 14:
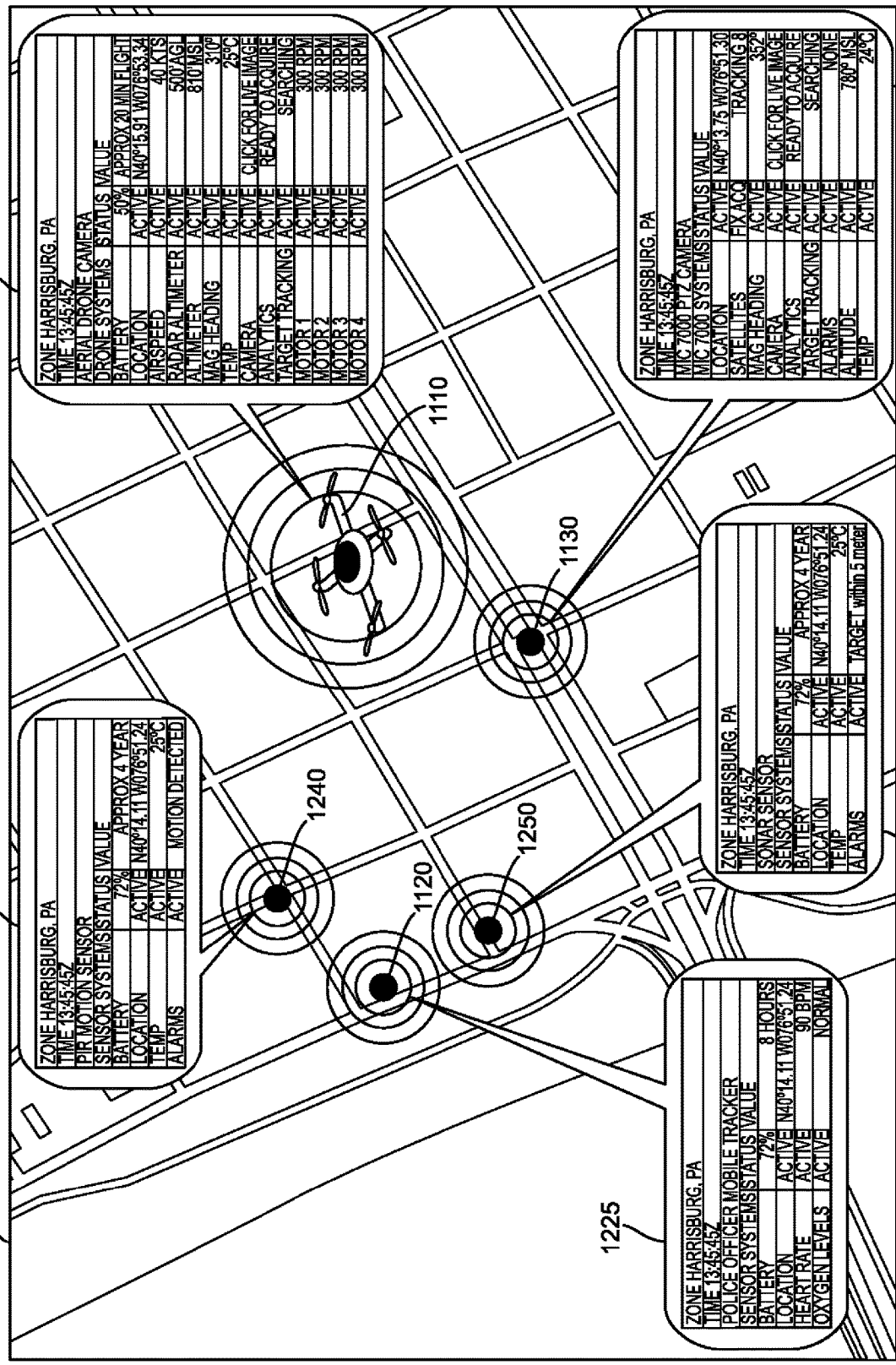
FIG. 14 is an illustration of another embodiment of the graphical user interface of FIG. 1.

FIG. 14 illustrates a detail view of the map 1120. The map 1120 displays the locations of the aerial drone camera 1110, the police officer vest camera 1115, and the street-view camera 1120 along with the locations of a motion sensor 1245 and a sonar sensor 1255. Sensor status is displayed that corresponds to each sensor and/or camera. Sensor status 1215 corresponding to an aerial drone (equipped with the aerial drone camera 1110) includes, for example, location, time, sensor type, battery status, direction, airspeed, altitude, heading, temperature, camera status, analytics, target tracking status, and motor(s) status of the aerial drone. Sensor status 1225 corresponding to the police officer vest camera 1115 displays, for example, location, time, sensor type, battery life, GPS, heart rate, and oxygen level. Sensor status 1235 corresponding to the street-view camera 1120 includes, for example, location (e.g., GPS coordinates), time, sensor type, number of satellite fixes, mag heading, camera image link, analytics, target tracking indicator, alarm indicator, altitude, and temperature. The motion sensor 1245 and the sonar sensor 1255 display similar information such as, for example, location, time, sensor type, sensor status, battery level, temperature, alarms, etc.

Thus, the invention provides, among other things, a surveillance system including an IP camera that is wirelessly connected to sensors. The IP camera determines the position of each of the sensors using local positioning techniques. Various features and advantages of the invention are set forth in the following claims.

What is claimed is:

1. A surveillance system comprising:
   a first video camera producing encoded video;
   a second video camera producing encoded video;
   a plurality of sensors wirelessly connected to the first camera, each of the plurality of sensors outputting condition information,
      wherein each sensor of the plurality of sensors is configured to
         broadcast a positional determination message including an identification of the sensor transmitting the positional determination message,
         detect positional determination messages transmitted by other sensors, and
         transmit to the first video camera information derived from one or more detected positional determination messages from other sensors;
   a controller included in the first video camera and having a processor and a memory configured to
      control the first video camera,
      receive the condition information from the plurality of sensors,
      detect positional determination messages transmitted by the plurality of sensors
      receive, from the plurality of sensors, the information derived from the one or more detected positional determination messages from other sensors,
      determine a location of each sensor of the plurality of sensors relative to the first video camera using the positional determination messages detected by the first video camera and the information derived by the plurality of sensor from the one or more detected positional received from other sensors, wherein the determined location of each of the plurality of sensors creates positional awareness for the first video camera, wherein positional awareness means that the first video camera knows the location of the plurality of sensors relative to itself,
      initiate tracking of a target based on the condition information from at least one sensor of the plurality of sensors and the determined location of the at least one sensor,
      track the target with the first video camera using the video,
      receive a request for position information of the tracked target from the second video camera, and
      transmit a response to the request for position information to the second video camera, wherein the response to the request for position information includes the location of the plurality of sensors relative to the first video camera and a position of the tracked target,
   wherein the second video camera it configured to locate the tracked target based on the position information received from the first video camera,
   wherein each sensor of the plurality of sensors is further configured to determine a timing of each positional determination message detected by the sensor, wherein the timing is indicative of a distance between the sensor detecting the positional determination message and the sensor broadcasting the positional determination message,
   wherein the controller is further configured to determine a timing of each positional determination message detected by the first video camera, wherein the timing is indicative of a distance between the first video camera and the sensor broadcasting the positional determination message,
   wherein the controller is configured to receive, from the plurality of sensors, the information derived from the one or more detected positional determination messages from other sensors by receiving, from the plurality of sensors, the timing of each positional determination message detected by the sensor, and
   wherein the controller is configured to determine the location of each sensor by determining the location of each sensor based on
      determined distances between the first video camera and each sensor of the plurality of sensors and
      determined distances between sensors of the plurality of sensors.

2. The system of claim 1, wherein the controller is further configured to determine a location of an event based on the positional awareness and the condition information.

3. The system of claim 1, further comprising
   a client device including a graphical user interface (GUI), the client device configured to communicate with the controller,
   wherein the controller is further configured to
      receive instructions from the GUI,
      configure the plurality of sensors based on instructions received from the GUI,
      configure the camera based on instructions received from the GUI, transmit the condition information to the GUI,
determine, based on the instructions, a priority level of an event, and
activate an external system based on the priority level.

4. The system of claim 1, wherein the video includes metadata and the controller is further configured to insert the condition information in the metadata such that the condition information is time synchronized with the video.

5. The system of claim 1, wherein the controller is further configured to
determine a presence of interference from an environmental condition based on the condition information and the video and
suppress the activation of an external system based on the presence of interference from an environmental condition.

6. The system of claim 1, wherein the controller is further configured to store the condition information and the position information in the memory of the camera, and wherein the condition information, when stored into memory, is categorized by a type of condition information and by a time of occurrence.

7. The system of claim 1, wherein the controller is further configured to activate an external system based on the positional awareness and the condition information, wherein the external system includes at least one selected from the group of a light switch, a siren, a recording device, an alarm, a valve controller, a load controller, a temperature controller, a door lock, and a load switch.

8. The system of claim 1, wherein the second video camera is located on a drone.

9. The system of claim 1, wherein the controller is further configured to transmit control information to the plurality of sensors based on environmental conditions detected by the video camera.

10. A surveillance system comprising:
a first video camera producing encoded video;
a second video camera producing encoded video;
a plurality of sensors wirelessly connected to the first camera, each of the plurality of sensors outputting condition information,
wherein each sensor of the plurality of sensors is configured to
broadcast a positional determination message including an identification of the sensor transmitting the positional determination message,
detect positional determination messages transmitted by other sensors, and
transmit to the first video camera information derived from one or more detected positional determination messages from other sensors;
a controller included in the first video camera and having a processor and a memory configured to
control the first video camera,
receive the condition information from the plurality of sensors,
detect positional determination messages transmitted by the plurality of sensors,
receive, from the plurality of sensors, the information derived from the one or more detected positional determination messages from other sensors,
determine a location of each sensor of the plurality of sensors relative to the first video camera using the positional determination messages detected by the first video camera and the information derived by the plurality of sensor from the one or more detected positional received from other sensors, wherein the determined location of each of the plurality of sensors creates positional awareness for the first video camera, wherein positional awareness means that the first video camera knows the location of the plurality of sensors relative to itself,
initiate tracking of a target based on the condition information from at least one sensor of the plurality of sensors and the determined location of the at least one sensor,
track the target with the first video camera using the video,
receive a request for position information of the tracked target from the second video camera, and
transmit a response to the request for position information to the second video camera, wherein the response to the request for position information includes the location of the plurality of sensors relative to the first video camera and a position of the tracked target,
wherein the second video camera it configured to locate the tracked target based on the position information received from the first video camera,
wherein each sensor of the plurality of sensors is further configured to determine an angle of incidence of each positional determination message detected by the sensor, wherein the angle of incidence is indicative of an angular position of the sensor broadcasting the positional determination message relative to the sensor detecting the positional determination message,
wherein the controller is further configured to determine an angle of incidence of each positional determination message detected by the first video camera, wherein the angle of incidence is indicative of an angular position of the sensor broadcasting the positional determination message relative to the first video camera,
wherein the controller is configured to receive, from the plurality of sensors, the information derived from the one or more detected positional determination messages from other sensors by receiving, from the plurality of sensors, the angle of incidence of each positional determination message detected by the sensor, and
wherein the controller is configured to determine the location of each sensor by determining the location of each sensor based on
the angular positions between the first video camera and each sensor of the plurality of sensors, and
the angular positions between sensors of the plurality of sensors.

11. The system of claim 10, wherein the controller is further configured to determine a location of an event based on the positional awareness and the condition information.

12. The system of claim 10, further comprising
a client device including a graphical user interface (GUI), the client device configured to communicate with the controller,
wherein the controller is further configured to
receive instructions from the GUI,
configure the plurality of sensors based on instructions received from the GUI,
configure the camera based on instructions received from the GUI,
transmit the condition information to the GUI,
determine, based on the instructions, a priority level of an event, and
activate an external system based on the priority level.

13. The system of claim 10, wherein the video includes metadata and the controller is further configured to insert the condition information in the metadata such that the condition information is time synchronized with the video.

14. The system of claim 10, wherein the controller is further configured to
- determine a presence of interference from an environmental condition based on the condition information and the video and
- suppress the activation of an external system based on the presence of interference from an environmental condition.

15. The system of claim 10, wherein the controller is further configured to store the condition information and the position information in the memory of the camera, and wherein the condition information, when stored into memory, is categorized by a type of condition information and by a time of occurrence.

16. The system of claim 10, wherein the controller is further configured to activate an external system based on the positional awareness and the condition information, wherein the external system includes at least one selected from the group of a light switch, a siren, a recording device, an alarm, a valve controller, a load controller, a temperature controller, a door lock, and a load switch.

17. The system of claim 10, wherein the second video camera is located on a drone.

18. The system of claim 10, wherein the controller is further configured to transmit control information to the plurality of sensors based on environmental conditions detected by the video camera.

* * * * *